(12) United States Patent
Takahashi et al.

(10) Patent No.: US 8,559,009 B2
(45) Date of Patent: Oct. 15, 2013

(54) IMAGE CALCULATION METHOD

(75) Inventors: Masanori Takahashi, Yokohama (JP);
Hiroshi Nomura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 241 days.

(21) Appl. No.: 13/236,037

(22) Filed: Sep. 19, 2011

(65) Prior Publication Data

US 2012/0212743 A1      Aug. 23, 2012

(30) Foreign Application Priority Data

Feb. 18, 2011  (JP) ................................ P2011-033904

(51) Int. Cl.
*G01J 4/00*  (2006.01)

(52) U.S. Cl.
USPC ........................................................ 356/369

(58) Field of Classification Search
USPC ........................................................ 356/369
See application file for complete search history.

(56) References Cited

U.S. PATENT DOCUMENTS 7,084,977 B2   8/2006  Nomura
7,283,207 B2 * 10/2007  Nomura .......................... 355/67

FOREIGN PATENT DOCUMENTS

JP    2005-116732    4/2005

* cited by examiner

*Primary Examiner* — Roy M Punnoose
(74) *Attorney, Agent, or Firm* — Finnegan, Henderson, Farabow, Garrett & Dunner, L.L.P.

(57) ABSTRACT

The embodiments relate to a method of calculating an image for simulating by calculation an image imaged by a projection optical system. In this method, a Stokes vector showing a characteristic of an illumination light is acquired first. Next, this Stokes vector is divided into a polarized light component vector and a non-polarized light component vector. The polarized light component vector is divided into a first coherent component vector and a first non-coherent component vector. The non-polarized light component vector is divided into a second coherent component vector and a second non-coherent component vector. Then, imaging calculation is performed at least for the first coherent component vector and the second coherent component vector, respectively.

20 Claims, 4 Drawing Sheets

IMAGE CALCULATION METHOD

CROSS REFERENCE TO RELATED APPLICATIONS

This application is based on and claims the benefit of priority from prior Japanese Patent Application No. 2011-33904, filed on Feb. 18, 2011, the entire contents of which are incorporated herein by reference.

FIELD

Embodiments described herein relate to an image calculation method for predicting, by calculation, an image imaged by a projection optical system.

BACKGROUND

A Jones matrix and a Mueller matrix are generally used to show a characteristic of an optical system of a semiconductor exposure apparatus and the like. A Jones matrix is a matrix with two rows and two columns, and expresses an optical characteristic of an optical element that passes a completely-polarized light.

When a light with a completely-polarized light that may be expressed by a Jones vector passes through an optical element to experience some conversion, a Jones matrix may be used for expressing a characteristic of the optical element.

The Jones matrix is advantageous in that calculation may be done in a conventional optical simulator using an electric-field vector.

However, the Jones matrix can deal with a completely-polarized light only (a light that does not include a non-polarized light component), and cannot handle a partially-polarized light including a non-polarized light component in a general optical simulator. Also, the Jones matrix cannot deal with an optical system having a property of generating a light with a polarized light component, and, on the other hand, dissolving a polarized light component.

A Stokes parameter and a Mueller matrix are generally used to express a characteristic of an optical system having a characteristic of generating an illumination light with a partially-polarized light, generating or dissolving a polarized light component. The Mueller matrix is a matrix with 4 rows and 4 columns for expressing an optical property of an optical element through which a partially-polarized light expressed by a Stokes parameter passes. A Stokes parameter may express: intensity of light as a whole; intensity of 0° linearly-polarized light component; intensity of 45° linearly-polarized light component; and intensity of circular-polarized light component, with parameters. Accordingly, the Stokes parameter may express a partially-polarized light including a non-polarized light component. When a partially-polarized light that may be expressed by a Stokes parameter passes through an optical element, and receives some conversion therefrom, a Mueller matrix may express the characteristic of the optical element.

In recent years, in order to improve a condition of an image of a mask pattern of a semiconductor exposure apparatus, a polarization state of an illumination light is controlled in a positive manner. Therefore, it is requested that a polarization state of an illumination light which passed a mask pattern be measured, for example. The inventor of this application has already proposed a device for measuring a state of polarization of an illumination light.

On the other hand, in a simulation device for calculating a state of an image provided by an optical system, and reproducing the image in a simulative manner, a Jones vector and a Jones matrix are used in view of easiness in operation. Thus, when a Stokes parameter that indicates a measured characteristic of an optical system is input to a simulation device, it is necessary to convert measured Stokes parameter into a Jones vector.

However, a Jones vector could deal with a completely-polarized light, but cannot deal with a partially-polarized light. Accordingly, even if a Stokes parameter expressing a partially-polarized light is obtained, the Stokes parameter cannot be input into a simulation device without any conversion. Thus, conventional technologies cannot provide a correct imaging calculation for an optical system having a characteristic of generating an illumination light with a partially-polarized light, generating or dissolving a polarized light component.

DETAILED DESCRIPTION

Figure 1:
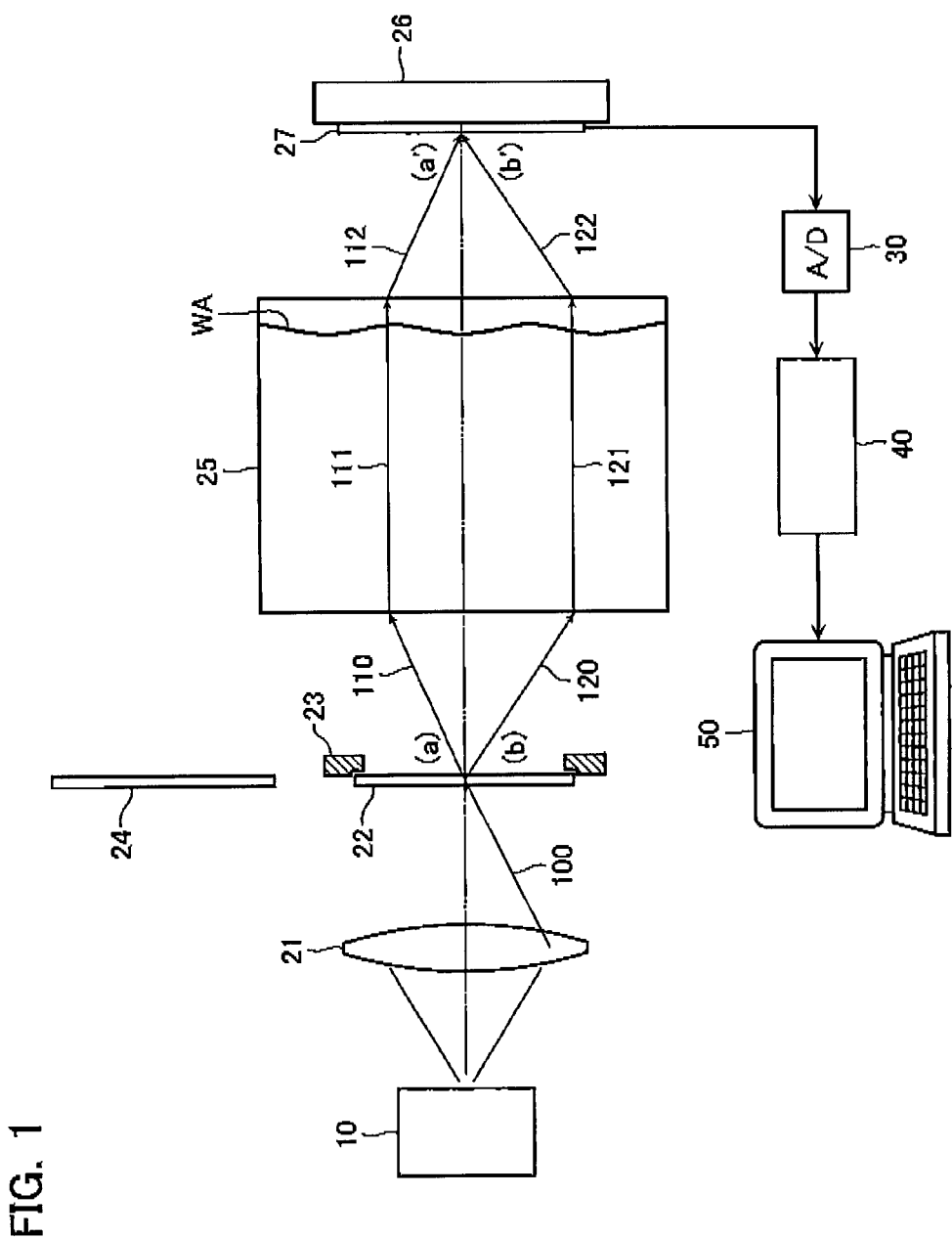
FIG. 1 is a schematic view illustrating a structure of the imaging optical system according to the first embodiment.

Embodiments described below relate to a method of calculating an image for simulating by calculation an image imaged by a projection optical system. In this method, a Stokes vector showing a characteristic of an illumination light is acquired first. Next, this Stokes vector is divided into a polarized light component vector and a non-polarized light component vector. The polarized light component vector is divided into a first coherent component vector and a first non-coherent component vector. The non-polarized light component vector is divided into a second coherent component vector and a second non-coherent component vector. Then, imaging calculation is performed at least for the first coherent component vector and the second coherent component vector, respectively.

Next, embodiments of the present invention are described with reference to the drawings. Before beginning explanation of the specific embodiments, significance of the present embodiments is described hereinbelow.

In the recent photolithography technology, a liquid immersion exposure device is put practical use. It fills a gap between a wafer and a lowermost lens immediately above the wafer with pure water, thereby realizing a super-high-NA projection lens exceeding NA=1. However, when NA exceeds 1, the maximum incident angle of the light in the resist exceeds 450. In this case, two light beams in the resist may cross each other with a right angle therebetween.

An electric field vector of a light may be divided into a component parallel to the incident plane (P-polarized light)

and a component perpendicular to the incident plane (S-polarized light). When two P-polarized light beams cross with a right angle, they cannot interfere sufficiently with each other. In this case, the two light beams become a stray light, and lower an image contrast thereof. Accordingly, a polarization control method for controlling a state of polarization of the illumination light as required is becoming more important. For example, in a liquid immersion exposure device, the S-polarized light component may be enhanced compared to the P-polarized light component. Such a polarization control method is important in an ArF exposure device or in an F2 laser exposure device as well as in a liquid immersion exposure device.

By the way, an optical system has, more or less, a characteristic of changing a state of polarization of a light passing therethrough. That is, in general, an optical system has, more or less, a characteristic of changing a non-polarized light to a polarized light (polarization generating effect). Particularly, in a device with a large NA such as a liquid immersion exposure device, the polarization generating effect is significant. On the contrary, these optical systems may sometimes have a characteristic that a polarization state of an illumination light is dissolved thereby changing a polarized light to a non-polarized light (depolarization effect). The depolarization effect can be suppressed to some extent by conducting a good optical design. However, it is difficult to completely eradicate the depolarization effect. It is impossible in the optical system with high NA to get rid of the polarization generation effect.

In such a situation, it can be said that most of the illumination lights of exposure devices are partially-polarized lights, and in most cases optical systems of exposure devices have either a polarization generating effect or a depolarization effect. Accordingly, when imaging of the exposure device is calculated, an illumination light with a partially-polarized light and an optical system with a polarization effect must be taken into consideration.

However, a Jones vector that cannot deal with a partially-polarized light and a Jones matrix are generally used in conventional optics simulators. Thus, when an illumination light of the exposure apparatus is a partially-polarized light, and an optical system thereof has a polarization generating effect or a depolarization effect, an imaging calculation by an optics simulator using such a Jones vector and a Jones matrix becomes impossible, even if a Stokes parameter or a Mueller matrix is obtained after measurement. This is a problem of the conventional art.

Here, outlines of a Jones vector, Jones matrix, Stokes parameter, and Mueller matrix will be described below.

A light with a completely-polarized light is generally represented by a Jones vector $\epsilon$ expressed by [Formula 1].

$$\varepsilon = \begin{bmatrix} E_x \\ E_y \end{bmatrix} = \begin{bmatrix} a_x e^{i\varphi_x} \\ a_y e^{i\varphi_y} \end{bmatrix}$$ [Formula 1]

In [Formula 1], $a_x$ and $a_y$ represent amplitudes of the light, and $\phi x$ and $\phi y$ represent phases thereof. Also, a polarization property of a certain optical system is expressed by a 2*2 Jones matrix J shown in [Formula 2].

$$J = \begin{bmatrix} J_{xx} & J_{xy} \\ J_{yx} & J_{yy} \end{bmatrix}$$ [Formula 2]

When polarization states of an incident light and an outgoing light are expressed by a Jones vector $\epsilon i$, $\epsilon o$, respectively, the Jones vector $\epsilon o$ can be represented by [Formula 3] shown below, using the Jones matrix J that indicates a polarization characteristic of the optical system.

$$\epsilon_o = J \epsilon_i$$ [Formula 3]

Each element Jxx, Jxy, Jyx, Jyy is a complex number, and each element $a_x e_i \phi^x$ and $a_y e_i \phi^y$ of the Jones matrix is also a complex number. Thus, since each element in the Jones vector and the Jones matrix is a complex number, which is different from the Mueller matrix, these elements cannot be measured directly.

A quantity that can be measured directly is a real number. For example, an optical power may be measured directly. Also, a Jones vector can represent a completely-polarized light only, and cannot represent a partially-polarized light including a non-polarized light.

In contrast, as a method for expressing a partially-polarized light including a non-polarized light, a Stokes parameter and a Mueller matrix is known.

A Stokes parameter is represented by [Formula 4] like a common vector. It is also called a Stokes vector. However, because a Stokes vector is not a vector in the mathematical meaning, special attention is necessary for an operation thereof.

$$S = \begin{bmatrix} s_0 \\ s_1 \\ s_2 \\ s_3 \end{bmatrix} = \begin{bmatrix} \langle E_x E_x^* \rangle + \langle E_y E_y^* \rangle \\ \langle E_x E_x^* \rangle - \langle E_y E_y^* \rangle \\ \langle E_x E_y^* \rangle + \langle E_x^* E_y \rangle \\ i\{\langle E_x E_y^* \rangle - \langle E_x^* E_y \rangle\} \end{bmatrix}$$ [Formula 4]

The Stokes parameter may be expressed by four elements s0-s3. The meanings of each element are as follows:

So: an intensity of the light as a whole;
S1: difference in intensity between 0° linearly-polarized light components;
s2: difference in intensity between +−45° linearly-polarized light components; and
s3: difference in intensity between clockwise and counter-clockwise circularly-polarized light components.

Ex and Ey represent amplitudes of electric field vectors in the x direction and the y direction, respectively. Ex * and Ey * represent amplitudes of electric field vectors which are complex conjugates of the electric field vectors Ex and Ey. Also, < > represents a time average of the product of the amplitudes.

A frequency of a light is several tens of THz, and a waveform (an amplitude, and a phase) of a light cannot be measured directly by existing measuring instruments. What can be measured with the existing measuring instruments is only an average of an amplitude (intensity) within a certain period. Thus, time average of one signal within the shortest cumulative time is calculated by the measuring instrument, and fluctuation thereof is specified. This allows the intensity of light to be measured. Light beams normally include fluctuation. Regarding a partially-polarized light, a relation of $s_0^2 > s_1^2 + s_2^2 + s_3^2$ may be satisfied.

When the fluctuation is small enough to be ignored with respect to performance of the measuring device, a relation of $s_0^2 = s_1^2 + s_2^2 + s_3^2$ is almost satisfied. In this case, the light can be considered to be a completely-polarized light.

On the contrary, when the fluctuation is large enough such that regularity thereof cannot be found, a relation of $s_0^2 > s_1^2 + s_2^2 + s_3^2 = 0$ is satisfied. In this case, the light can be considered to be completely-non-polarized light.

When a polarization state of a light is expressed by a Stokes vector, a polarization property of an optical system is expressed by a 4*4 Mueller matrix shown in [Formula 5].

$$M = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix}$$ [Formula 5]

When polarization states of an incident light and outgoing light are represented by Stokes vectors $S_i$ and $S_o$, respectively, the Stokes vector $S_o$ of the outgoing light may be represented using a Mueller matrix M, as follows.

$$S_o = \mathbf{M} S_i$$ [Formula 6]

Each element $s_0$-$s_3$ in a Stokes vector S is a real number, and therefore each element $m_{ij}$ of the Mueller matrix M may also be represented by a real number. These elements may be measured by measuring a time average of the intensity of the light.

However, calculation for calculating an imaging state may be performed more easily when a Jones vector and a Jones matrix are used. Thus, in a general optics simulator, a Jones vector and a Jones matrix are utilized rather than a Mueller matrix and a Stokes parameter.

The present embodiments provide a method of converting the Stokes parameter acquired by measuring an optical power of the illumination light of the exposure device into a Jones vector, thereby utilizing a result of measurement of the Stokes parameter in an optics simulator. In other words, the present embodiment intends to convert a Stokes vector acquired by measurement into a Jones vector, and use the Jones vector in the simulation device 50 to perform an imaging calculation of the exposure device.

[First Embodiment]

Next, an image calculation method according to the first embodiment, is described hereinbelow with reference to FIG. 1.

FIG. 1 shows an outline of a structure of a semiconductor exposure apparatus which is subject to a method of calculating imaging. This semiconductor exposure apparatus comprises a light source 10, an illumination light source surface 21, a photomask 22, a photomask stage 23, a polarization evaluation mask 24, a projection optical system 25, a wafer stage 26, a photodetector 27, an A/D converter 30, an operating device 40, and a simulation device 50. The operation device 40 may include a memory (a storage medium) that stores a computer program for executing a later-described method for calculating imaging, and a computer for executing the computer program. The light source 10 is a laser light source device, for example. The illumination light source surface 21 is a secondary light source surface based on the light from the light source 10.

Note that, between the light source 10 and the illumination light source surface 21, a depolarization plate or a polarization plate may be arranged depending on the situation.

The photomask 22 is a mask plate on which a mask pattern to be projected onto a wafer is formed. The photomask 22 is mounted and fixed on a photomask stage 23. When an exposure operation is performed, the photomask 22 is irradiated by a light from illumination light source surface 21, and the mask pattern of the photomask 22 is projected onto the wafer (not illustrated in FIG. 1).

When a polarization property of the illumination light from the illumination light source surface 21 is measured to acquire a Stokes vector of the illumination light, a polarization evaluation mask 24 is mounted on the photomask stage 23 in place of the photomask 22. The illumination light from the illumination light source surface 21 reaches the photodetector 27 via the polarization evaluation mask 24 and the projection optical system 25. The operation device 40 converts an output signal of the photodetector 27 to a digital signal through the AD converter 30, and thereafter measures the Stokes vector of the illumination light based on the digital signal. Since the structure of the polarization evaluation mask 24 is well-known, the description thereof is omitted here. Also, a method of measuring a Stokes vector itself is not a main aspect of the present embodiment. Since a Stokes vector of an illumination light may be calculated using various types of known methods besides a method described in the above-described Japanese Patent Publication, a detailed description thereof is omitted here.

Also, a method of measuring a Mueller matrix of the projection optical system 25 is well-known. In addition, measurement of a Stokes vector of an illumination light and measurement of a Mueller matrix is well-known. The method of measuring a Mueller matrix is not a main aspect of the present embodiment, and various types of methods may be adopted.

Figure 2:
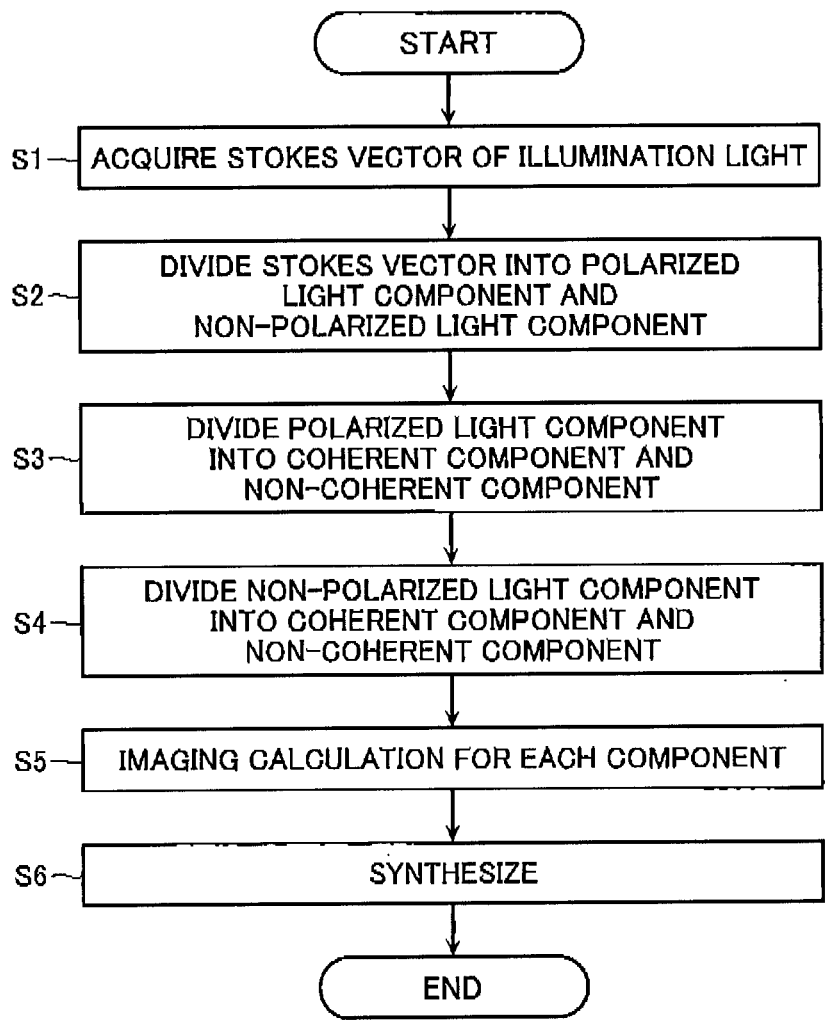
FIG. 2 is a flowchart showing a procedure for executing an imaging calculation method for an imaging optical system according to the first embodiment.

An outlined procedure of the method of calculating imaging according to the present embodiment is described with reference to a flow chart of FIG. 2. First, a Stokes vector of the illumination light from the illumination light source surface 21 is acquired by performing measurement as stated above (S1). Then, a Stokes vector acquired is divided into a polarization light component vector and a non-polarized light component vector (S2).

The polarization light component vector is divided into a coherent component vector and a non-coherent component vector (S3). At the same time, the non-polarized light component vector is also divided into a coherent component vector and a non-coherent component vector (S4).

Then, these coherent component vectors and non-coherent component vectors are subjected to imaging calculation, respectively (S4). Thereafter, these calculation results are synthesized (S6), Each of the steps will be described in detail hereinbelow.

Step S1 is performed as described above. Next, Step S2 is described. Generally speaking, any Stokes vector S may be divided into a completely-polarized light component and a completely-non-polarized light component, using [Formula 7], $$s = s_0 \begin{bmatrix} 1 \\ \vec{s} \end{bmatrix} = s_0 s \begin{bmatrix} 1 \\ \hat{s} \end{bmatrix} + s_0(1-s) \begin{bmatrix} 1 \\ \vec{0} \end{bmatrix}$$ [Formula 7]

The meaning of the marks in [Formula 7] is as shown by [Formula 8].

$$(s_0, s_1, s_2, s_3)^T = s_0(1, \vec{s})^T$$

$$\vec{s}(s_1/s_0, s_2/s_0, s_3/s_0)^T$$

In [Formula 7], "$\hat{s}$" means a unit vector along a vector $\rightarrow$s. Also, "s" denotes a norm of the vector $\rightarrow$s (s=|$\rightarrow$s|). That is, "S" denotes a degree of polarization (DOP). In addition, "→0" represents a zero vector $(0, 0, 0)^T$.

The first term of [Formula 7] is a Stokes vector for a completely-polarized light component, and the second term thereof is a Stokes vector for a non-polarized light component. The Stokes vector for a completely-polarized light component may be standardized as shown by the first equation in [Formula 9]. Then it may be converted to a Jones vector as shown in the second equation of [Formula 9].

$$(1, \hat{s}^T)^T = (1, s'_1, s'_2, s'_3)^T \quad \text{[Formula 9]}$$

$$\begin{bmatrix} 1 \\ \hat{s} \end{bmatrix} \Rightarrow \frac{1}{\sqrt{2}} e^{i\delta_x} \begin{bmatrix} a_x \\ a_y e^{i\delta} \end{bmatrix}$$

where $$a_x = \sqrt{1 + s'_1}$$

$$a_y = \sqrt{1 - s'_1}$$

$$\tan\delta = s'_3 / s'_2$$

Next, focusing on one light beam in the device of FIG. 1, division of a Stokes parameter is explained. Although the illumination light source surface 21 is not a point light source but a surface light source, explanation here proceeds, for making explanation easy to understand, assuming that only one point on the illumination light source surface 21 emits a light. In real imaging calculation, integration may be performed in consideration of a shape and a brightness distribution of the illumination light source.

For example, as shown in FIG. 1, one light beam 100 emitted from the illumination light source surface 21 is diffracted by the mask pattern of the photomask 22, and is divided into a diffraction light beam (a) and a diffraction light beam (b). The diffraction light beam (a) runs as a light beam 110, 111, and 112 and reaches the wafer 4. On the other hand, the diffraction light beam (b) runs as a light beam 120, 121, and 122 and reaches the wafer 4.

It is assumed here that a Stokes vector S of the light beam 100 emitted from the illumination light source surface 21 has light intensity of 1, and is defined by [Formula 10] as below. In this case, according to above-mentioned [Formula 7], the Stokes vector of the light beam 100 may be divided into a polarized light component vector $S_p$ and a non-polarized light component vector $S_{np}$, as shown in [Formula 11].

$$s = s_0(1, \vec{s})^T \quad \text{[Formual 10]}$$

$$S = S_p + S_{np} \quad \text{[Formula 11]}$$

$$s_p = s_0 s \begin{bmatrix} 1 \\ \hat{s} \end{bmatrix}$$

$$s_{np} = s_0(1-s) \begin{bmatrix} 1 \\ \vec{0} \end{bmatrix}$$

Diffraction by the pattern of the photomask 2 keeps a degree of polarization unchanged. Accordingly, the Stokes vector of the diffraction light (a) and the diffraction light (b) may be represented by a product of the Stokes vector of the light beam 100 and the diffraction efficiency.

The diffraction light expressed by the Stokes vectors (the polarized light component vector $S_p$ and the non-polarized light component vector $S_{np}$) of [Formula 11] is affected by a Mueller matrix M corresponding to a light path when it passes through the projection optical system 25. Then, it changes to the following form shown in [Formula 12].

$$M s_0 \begin{bmatrix} 1 \\ \vec{s} \end{bmatrix} = s_0 s M \begin{bmatrix} 1 \\ \hat{s} \end{bmatrix} + s_0 (1-s) M \begin{bmatrix} 1 \\ \vec{0} \end{bmatrix} \quad \text{[Formula 12]}$$

Here, the Mueller matrix M can be re-written as follows.

$$M = m_{00} \begin{bmatrix} 1 & \vec{D}^T \\ \vec{P} & m \end{bmatrix} \quad \text{[Formual 13]}$$

Note that m denotes a 3*3 matrix, →D denotes a dichroic vector, and P denotes polarizing capability vector, each of which may be expressed by [Formula 14] shown below, respectively.

$$\begin{cases} \vec{D} = \left(\frac{m_{01}}{m_{00}}, \frac{m_{02}}{m_{00}}, \frac{m_{03}}{m_{00}}\right)^T \\ \vec{P} = \left(\frac{m_{10}}{m_{00}}, \frac{m_{20}}{m_{00}}, \frac{m_{30}}{m_{00}}\right)^T \end{cases} \quad \text{[Formula 14]}$$

Now, [Formula 12] is under consideration again. When the coefficient of the [Formula 12] is ignored, the first term of [Formula 12] can be re-written as follows, using the expression of [Formula 13].

$$M \begin{bmatrix} 1 \\ \hat{s} \end{bmatrix} = m_{00} \begin{bmatrix} 1 & \vec{D}^T \\ \vec{P} & m \end{bmatrix} \begin{bmatrix} 1 \\ \hat{s} \end{bmatrix} \quad \text{[Formula 15]}$$

$$= m_{00} \begin{bmatrix} 1 + \vec{D}^T \hat{s} \\ \vec{P} + m\hat{s} \end{bmatrix}$$

$$= m_{00} \begin{bmatrix} |\vec{P} + m\hat{s}| \\ \vec{P} + m\hat{s} \end{bmatrix} +$$

$$m_{00}\left(1 + \vec{D}^T \hat{s} - |\vec{P} + m\hat{s}|\right) \begin{bmatrix} 1 \\ \vec{0} \end{bmatrix}$$

The first term of [Formula 15] represents a part of the completely-polarized light component of the light beam 110 that arrives at the wafer stage 26 while being kept as a completely-polarized light, although a state of polarization thereof changes. That is, the first term of [Formula 15] represents a coherent light component which does not lose coherency even after passing through the projection optical system 25 (this component is hereinafter referred to as a coherent component vector). On the other hand, the second term of [Formula 15] represents a component which has become non-polarized during a process of passing through the projection optical system 25. That is, the second term shows a component which lost coherency by passing through the projection optical system 25 (this component is referred to as a non-coherent component vector).

The diffraction light (a) and the diffraction light (b) pass through different light paths from each other, and are affected by different Mueller matrice M. However, the first terms of [Formula 15] acquired for the diffraction light (a) and the diffraction light (b), respectively, may keep coherency against each other, and these terms are completely-polarized light components that may be converted to Jones vectors. Thus, the first terms of [Formula 15] can be subjected to imaging calculation in the simulation device 50 using a Jones vector and a Jones matrix.

On the other hand, the second terms of [Formula 15] acquired for the diffraction light (a) and the diffraction light (b), respectively, are non-polarized ones, and the phases thereof cannot be identified. It is assumed that coherency of the diffraction light (a) and the diffraction light (b) is lost. That is, these terms need to be treated as stray lights. Since the second terms of [Formula 15] are completely-non-polarized light components, imaging calculation thereof may be performed in the simulation device using a Jones vector and a Jones matrix.

To sum up, the Stokes vector S expressed by [Formula 10] may be divided into the polarized light component vector $S_p$ and the non-polarized light component vector $S_{np}$. Thereafter, the polarized light component vector $S_p$ can be further divided into a coherent component vector and a non-coherent component vector expressed by [Formula 16] and [Formula 17].

Coherent component vector [Formula 16]

$$s_0 s m_{00} \begin{bmatrix} |\vec{P} + m\hat{s}| \\ \vec{P} + m\hat{s} \end{bmatrix}$$

Non-coherent component vector [Formula 17]

$$s_0 s m_{00} \left(1 + \vec{D}^T \hat{s} - |\vec{P} + m\hat{s}|\right) \begin{bmatrix} 1 \\ \vec{0} \end{bmatrix}$$

Next, how to handle the second term of [Formula 12], i.e., a non-polarized light component vector will be described. A non-polarized light component vector may be treated as a sum of two incoherent completely-polarized lights that are orthogonal to each other. When it is represented by a Stokes vector, it can be represented by [Formula 18].

$$\begin{bmatrix} 1 \\ \vec{0} \end{bmatrix} = \frac{1}{2} \cdot \begin{bmatrix} 1 \\ \hat{s}_i \end{bmatrix} + \frac{1}{2} \cdot \begin{bmatrix} 1 \\ -\hat{s}_i \end{bmatrix}$$ [Formula 18]

Here, $\hat{S}_i$ denotes a unit vector. When this [Formula 18] is used, the second term of [Formula 12] can be represented by [Formula 19] below.

$$M \begin{bmatrix} 1 \\ \vec{0} \end{bmatrix} = \frac{m_{00}}{2} \left\{ \begin{bmatrix} 1 & \vec{D}^T \\ \vec{P} & m \end{bmatrix} \begin{bmatrix} 1 \\ \hat{s}_i \end{bmatrix} + \begin{bmatrix} 1 & \vec{D}^T \\ \vec{P} & m \end{bmatrix} \begin{bmatrix} 1 \\ -\hat{s}_i \end{bmatrix} \right\}$$ [Formula 19]

$$= \frac{m_{00}}{2} \left\{ \begin{bmatrix} |\vec{P} + m\hat{s}| \\ \vec{P} + m\hat{s}_i \end{bmatrix} + \begin{bmatrix} |\vec{P} - m\hat{s}| \\ \vec{P} - m\hat{s}_i \end{bmatrix} \right\} +$$

$$m_{00} \left(1 - \frac{|\vec{P} + m\hat{s}_i| + |\vec{P} - m\hat{s}_i|}{2}\right) \begin{bmatrix} 1 \\ \vec{0} \end{bmatrix}$$

The first term of [Formula 19] maintains coherency (it is a coherent component vector), because it is represented by a sum of two incoherent linearly-polarized lights. It is assumed here that no cross-talk is included therein.

On the other hand, coherency is lost in the second term of [Formula 19]. This is because the second term of [Formula 19] expresses a component which has become a non-polarized light (a non-coherent component vector) after it passed through the projection optical system 25.

However, when the non-polarized light component vector is treated as a sum of two incoherent completely-polarized lights according to [Formula 19], the result of calculation may vary depending on how a unit vector $\hat{S}_i$ is defined. This contradicts the actual result.

The second term of [Formula 19] represents a stray light generated by a depolarization effect of the projection optical system 25. The following formula [Formula 20] included in the second term of [Formula 19] represents an average of a length of vectors represented by [Formula 21] and [Formula 22].

$$\frac{|\vec{P} + m\hat{s}_i| + |\vec{P} - m\hat{s}_i|}{2}$$ [Formula 20]

$$\vec{P} + m\hat{s}_i$$ [Formula 21]

$$\vec{P} - m\hat{s}_i$$ [Formula 22]

The value of the [Formula 20] may vary depending on whether the vector $\rightarrow P$ and the vector $m\hat{S}_i$ are parallel to each other or orthogonal to each other. Accordingly, the average value may vary depending on how the direction of the vector $\hat{S}_i$ is chosen. However, in principle, the average value must be a constant value regardless of how the vector $\hat{S}_i$ is chosen.

Figure 3:
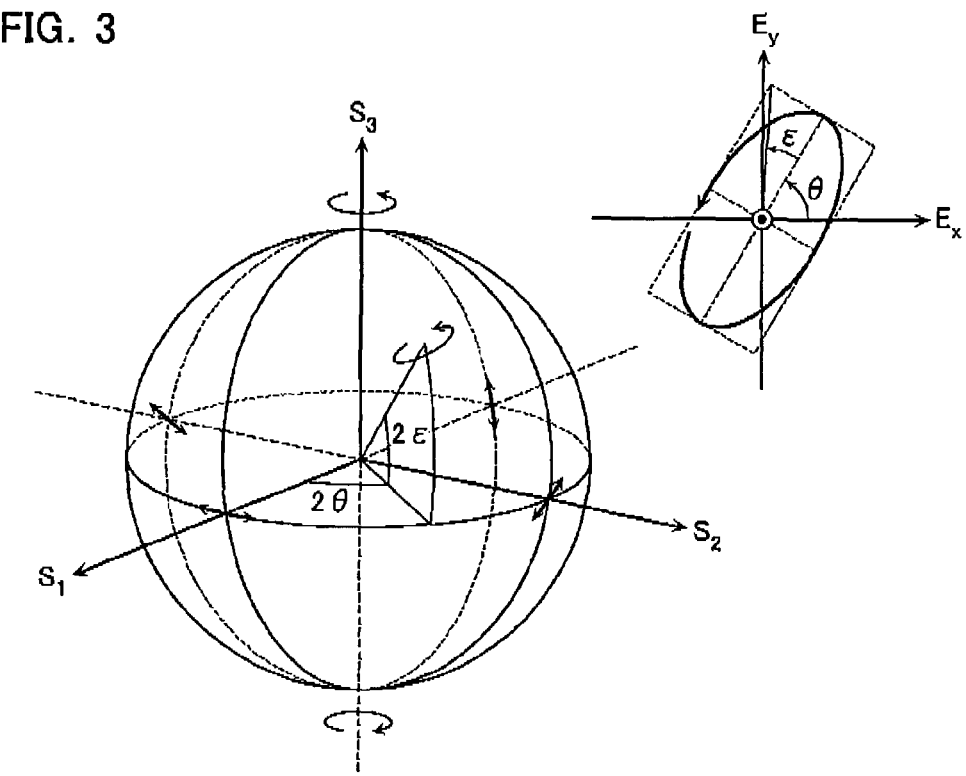
FIG. 3 shows a Poincare sphere.

As shown in FIG. 3, a polarization state is visually expressed using a Poincare sphere having a radius of 1. Points on the surface of the Poincare sphere represent completely-polarized lights. Points on the equator of the Poincare sphere represent linearly-polarized light. The higher is the latitude of the point, the closer is the degree of polarization to a perfect-circular polarized light, rather than an elliptically-polarized light.

Points (except the origin) inside the Poincare sphere represent partially-polarized lights. A completely-non-polarized light is expressed by the origin of the Poincare sphere. On the other hand, a completely-non-polarized light may be regarded as a set of various completely-polarized lights.

That is, when a plurality of completely-polarized lights are dispersed on the surface of the Poincare sphere, a centroid (a synthesized vector) thereof represent a state of polarization as a whole. Thus, when the completely-polarized lights are scattered uniformly on the surface of the Poincare sphere, the centroid (a synthesized vector) coincides with the origin of the Poincare sphere, and the light becomes a completely-non-polarized light. However, when the dispersion includes bias, the centroid is shifted from the origin. That is, the light becomes a partially-polarized light.

From a similar viewpoint, a completely-non-polarized light may be expressed by two completely-polarized lights that are symmetrical with respect to the origin. That is, it may be expressed by [Formula 18]. However, it cannot be said that the expression is more correct compared to the case when expression is made by a synthesis of plural completely-polarized lights that are uniformly dispersed. Thus, it is preferable that the second term of [Formula 19] is re-written as shown by [Formula 23], that is, by a set of a plurality of completely-polarized lights that are uniformly dispersed.

$$m_{00}\left[1-\lim_{n\to\infty}\left\{\frac{1}{n}\sum_{i=1}^{n}|\vec{P}+m\hat{s}_i|\right\}\right]=$$

$$m_{00}\left[1-\frac{4\int\int|\vec{P}+m\hat{s}_i|\cos 2\varepsilon d\varepsilon d\theta}{4\int\int\cos 2\varepsilon d\varepsilon d\theta}\right]=$$

$$m_{00}-\frac{m_{00}}{\pi}\int\int|\vec{P}+m\hat{s}_i|\cos 2\varepsilon d\varepsilon d\theta$$

[Formula 23]

However, unfortunately, this [Formula 23] is difficult to be solved analytically, because it ends up in double integration of elliptic integration, which cannot be represented by an elementary function. Thus, from a realistic point of view, an approximation formula such as [Formula 24] is prepared. Then, the way of choosing ˆsi that is sufficiently similar to [Formula 20] must be considered, under a number k of the minimum polarization state, while keeping the centroid in the origin of the Poincare sphere.

$$m_{00}\left[1-\frac{1}{k}\sum_{i=1}^{k}|\vec{P}+m\hat{s}_i|\right]\approx m_{00}\left[1-\lim_{n\to\infty}\left\{\frac{1}{n}\sum_{i=1}^{n}|\vec{P}+m\hat{s}_i|\right\}\right]$$

[Formual 24]

Figure 4:
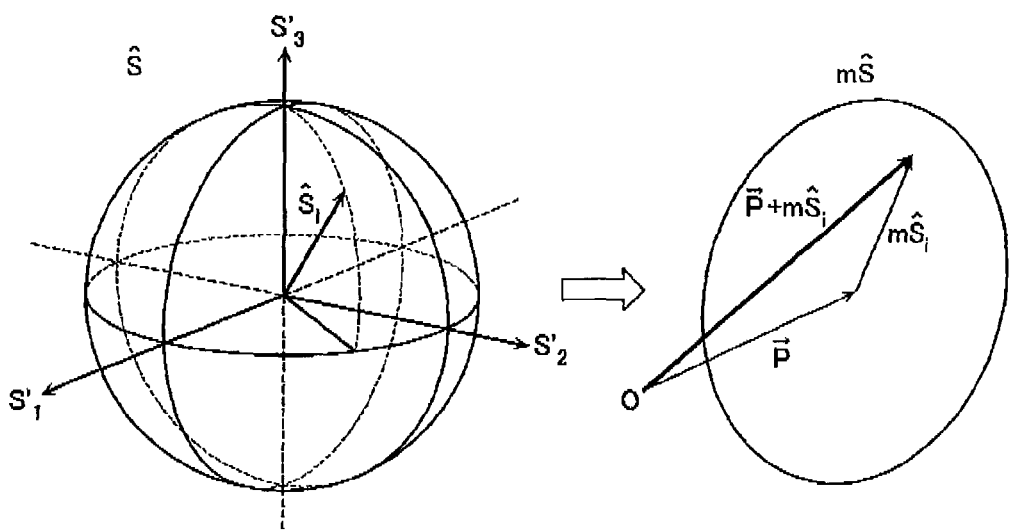
FIG. 4 shows an ellipsoid formed by projecting, by a Mueller matrix, polarization states distributed on the surface of the Poincare sphere.

As shown in FIG. 4, unit vectors ˆSi of a plurality of completely-polarized lights expressing a completely-non-polarized light are dispersed on the surface of the Poincare sphere having a radius of 1. These unit vectors ˆSi are converted, by passing through the projection optical system 25, into an elliptical sphere which is expressed by [Formula 25] shown below.

$$m\hat{s}_i$$

[Formula 25]

The vector represented by [Formula 21] is a vector that extends from the origin O to a point on the surface of the elliptical sphere that is expressed by [Formula 25]. Thus,

[Formula 26] shown below represents an average value of the distance from the origin O of the Poincare sphere to a point on the elliptical sphere of [Formula 25].

$$\frac{1}{k}\sum_{i=1}^{k}|\vec{P}+m\hat{s}_i|$$

[Formula 26]

From a viewpoint of geometry, it turns out that the vectors ˆSi are preferably selected from six vectors shown below.

$$\begin{bmatrix}1\\\vec{0}\end{bmatrix}=\frac{1}{6}\left\{\begin{bmatrix}1\\1\\0\\0\end{bmatrix}+\begin{bmatrix}1\\-1\\0\\0\end{bmatrix}+\begin{bmatrix}1\\0\\1\\0\end{bmatrix}+\begin{bmatrix}1\\0\\-1\\0\end{bmatrix}+\begin{bmatrix}1\\0\\0\\1\end{bmatrix}+\begin{bmatrix}1\\0\\0\\-1\end{bmatrix}\right\}$$

[Formula 27]

Figure 5:
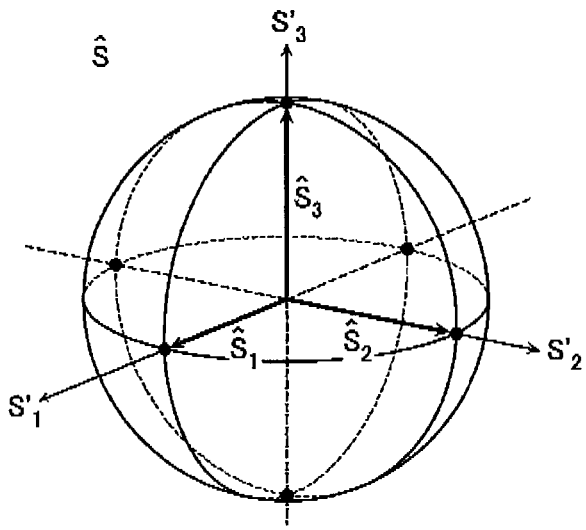
FIG. 5 illustrates six polarization states used for a method of calculating imaging according to the first embodiment.

Especially, as a matter of practical convenience, it is preferable that vectors shown by [Formula 28] and FIG. 5 are defined, and an expression as shown in [Formula 29] is made.

$$\hat{s}_1=(1,0,0)^T$$
$$\hat{s}_2=(0,1,0)^T$$
$$\hat{s}_3=(0,0,1)^T$$

[Formula 28]

$$\begin{bmatrix}1\\\vec{0}\end{bmatrix}=\frac{1}{6}\left\{\begin{bmatrix}1\\\hat{s}_1\end{bmatrix}+\begin{bmatrix}1\\-\hat{s}_1\end{bmatrix}+\begin{bmatrix}1\\\hat{s}_2\end{bmatrix}+\begin{bmatrix}1\\-\hat{s}_2\end{bmatrix}+\begin{bmatrix}1\\\hat{s}_3\end{bmatrix}+\begin{bmatrix}1\\-\hat{s}_3\end{bmatrix}\right\}$$

[Formula 29]

When The second term of [Formula 12] is re-calculated using this [Formula 29], it can be re-written as follows.

$$M\begin{bmatrix}1\\\vec{0}\end{bmatrix}=\frac{m_{00}}{6}\left\{\begin{bmatrix}|\vec{P}+m\hat{s}_1|\\\vec{P}+m\hat{s}_1\end{bmatrix}+\begin{bmatrix}|\vec{P}-m\hat{s}_1|\\\vec{P}-m\hat{s}_1\end{bmatrix}+\begin{bmatrix}|\vec{P}+m\hat{s}_2|\\\vec{P}+m\hat{s}_2\end{bmatrix}+\right.$$

$$\left.\begin{bmatrix}|\vec{P}-m\hat{s}_2|\\\vec{P}-m\hat{s}_2\end{bmatrix}+\begin{bmatrix}|\vec{P}+m\hat{s}_3|\\\vec{P}+m\hat{s}_3\end{bmatrix}+\begin{bmatrix}|\vec{P}-m\hat{s}_3|\\\vec{P}-m\hat{s}_3\end{bmatrix}\right\}+$$

$$m_{00}\left\{1-\frac{1}{6}\sum_{i=1}^{3}(|\vec{P}+m\hat{s}_i|+|\vec{P}-m\hat{s}_i|)\right\}\begin{bmatrix}1\\\vec{0}\end{bmatrix}$$

[Formula 30]

In brief, the Stokes vector S expressed by [Formula 10] is divided into the polarized light component vector $S_p$ and the non-polarized light component vector $S_{np}$. The non-polarized light component vector $S_{np}$ may further be divided into a coherent component vector and a non-coherent component vector expressed by [Formula 31] and [Formula 32].

[Formula 31]

$$\frac{s_0(1-s)m_{00}}{6}\left\{\begin{bmatrix}|\vec{P}+m\hat{s}_1|\\\vec{P}+m\hat{s}_1\end{bmatrix}+\right.$$

$$\left.\begin{bmatrix}|\vec{P}-m\hat{s}_1|\\\vec{P}-m\hat{s}_1\end{bmatrix}+\begin{bmatrix}|\vec{P}+m\hat{s}_2|\\\vec{P}+m\hat{s}_2\end{bmatrix}+\begin{bmatrix}|\vec{P}-m\hat{s}_2|\\\vec{P}-m\hat{s}_2\end{bmatrix}+\begin{bmatrix}|\vec{P}+m\hat{s}_3|\\\vec{P}+m\hat{s}_3\end{bmatrix}+\begin{bmatrix}|\vec{P}-m\hat{s}_3|\\\vec{P}-m\hat{s}_3\end{bmatrix}\right\}$$

Non-coherent component vector    [Formula 32]

$$s_0(1-s)m_{00}\left\{1-\frac{1}{6}\sum_{i=1}^{3}(|\vec{P}+m\hat{s}_i|+|\vec{P}-m\hat{s}_i|)\right\}\begin{bmatrix}1\\\vec{0}\end{bmatrix}$$

As discussed above, in the present embodiment, a Stokes vector S acquired by measurement is divided into a polarized light component vector $S_p$ and a non-polarized light component vector $S_{np}$. Furthermore, each of them is divided into a coherent component vector and a non-coherent component vector, thereby acquiring [Formula 16], [Formula 17], [Formula 31] and [Formula 32].

Then, these four Stokes vectors are converted into Jones vectors, and these Jones vectors are independently subjected to imaging calculation. A desired calculation result is acquired after these four results of imaging calculations are synthesized. Note that [Formula 17] and [Formula 32] are components which do not contribute to interference. Accordingly, it is possible that imaging calculations are performed only for [Formula 16] and [Formula 31], and regarding [Formula 17] and [Formula 32], a uniform intensity as a background light is added to the whole calculation result. It is needless to say that similar imaging calculation may be performed for [Formula 17] and [Formula 32].

Next, a method of converting Stokes vectors of [Formula 16] and [Formula 31] into Jones vectors will be described below.

First, for simplification of explanation, the following rewriting is performed.

$$\vec{P} + m\hat{s} = \vec{q} \qquad \text{[Formula 33]}$$

Then, [Formula 16] can be re-written as follows, when the coefficient thereof is ignored.

$$\begin{bmatrix} |\vec{P} + m\hat{s}| \\ \vec{P} + m\hat{s} \end{bmatrix} = \begin{bmatrix} |\vec{q}| \\ \vec{q} \end{bmatrix} = q \begin{bmatrix} 1 \\ \hat{q} \end{bmatrix} \qquad \text{[Formula 34]}$$

The Stokes vector corresponding to such a completely-polarized light can be converted, under the definition of [Formula 35], into a Jones vector such as shown in [Formula 36].

$$(1, \hat{q}^T)^T = (1, q'_1, q'_2, q'_3)^T \qquad \text{[Formula 35]}$$
$$a_x = \sqrt{1 + q'_1}$$
$$a_y = \sqrt{1 - q'_1}$$
$$\tan\delta = q'_3 / q'_2$$

$$\begin{bmatrix} 1 \\ \hat{q} \end{bmatrix} \Rightarrow \frac{1}{\sqrt{2}} e^{i\delta_x} \begin{bmatrix} a_x \\ a_y e^{i\delta} \end{bmatrix} \qquad \text{[Formula 36]}$$

In this conversion process, a phase δX in the X-direction is set as a reference phase. However, this reference phase cannot be identified from the Stokes vector. On the other hand, in normal measurement of wavefront aberration, interference measurement using a light source with a non-polarized light is performed. In this case, it may be construed that an average phase front in the X-direction and Y-direction is measured as wave aberration. Thus, conversion may be performed as follows.

$$\begin{bmatrix} 1 \\ \hat{q} \end{bmatrix} \Rightarrow \frac{1}{\sqrt{2}} e^{i\delta} \begin{bmatrix} a_x e^{-\delta/2} \\ a_y e^{\delta/2} \end{bmatrix} \qquad \text{[Formula 37]}$$

The reference phase/δ is an average phase of a light immediately after it passed through the projection optical system 25. Accordingly, the reference phase/δ may be defined by [Formula 38], in order that the reference phase/δ coincides with the wavefront aberration WA shown in FIG. 1. This allows the aberration to be incorporated to the Jones vector after the conversion.

$$\delta = W \qquad \text{[Formula 38]}$$

As discussed above, according to the present embodiment, a Stokes parameter acquired by measuring an optical power of an illumination light of an exposure device may be converted into a Jones vector. This allows the result of measurement of the Stokes parameter to be utilized in an optics simulator.

Note that the conversion from a Jones matrix J to a Mueller matrix M can be easily performed using [Formula 39] shown below.

$$\mathbf{M} = U(J \otimes J^*)U^{-1} \qquad \text{[Formula 39]}$$

Here, ⊗ indicates Kronecker product, matrix J * indicates an adjoint matrix of the Jones matrix J. Also, the matrix U is represented by [Formula 40] below. Moreover, the matrix $U^{-1}$ is an inverse matrix of the matrix U.

$$U = \begin{bmatrix} 1 & 0 & 0 & 1 \\ 1 & 0 & 0 & -1 \\ 0 & 1 & 1 & 0 \\ 0 & i & -i & 0 \end{bmatrix} \qquad \text{[Formula 40]}$$

It is noted that conversion from a Mueller matrix M to a Jones matrix may be performed by [Formula 41] only when a Mueller matrix M does not have a depolarization effect. This is because a Jones matrix does not deal with a partially-polarized light and a non-polarized light.

$$\begin{cases} J_{xx} = \frac{1}{\sqrt{2}} \sqrt{m_{00} + m_{01} + m_{10} + m_{11}} \\ J_{xy} = \frac{1}{\sqrt{2}} \sqrt{\frac{m_{00} - m_{01} + m_{10} - m_{11}}{(m_{02} + m_{12})^2 + (m_{03} + m_{13})^2}} \\ \qquad (m_{02} + m_{12} - i[m_{03} + m_{13}]) \\ J_{yx} = \frac{1}{\sqrt{2}} \sqrt{\frac{m_{00} + m_{01} - m_{10} - m_{11}}{(m_{20} + m_{21})^2 + (m_{30} + m_{31})^2}} \\ \qquad (m_{20} + m_{21} + i[m_{30} + m_{31}]) \\ J_{yy} = \frac{1}{\sqrt{2}} \sqrt{\frac{m_{00} - m_{01} - m_{10} + m_{11}}{(m_{22} + m_{33})^2 + (m_{32} - m_{23})^2}} \\ \qquad (m_{22} + m_{33} + i[m_{32} - m_{23}]) \end{cases} \qquad \text{[Formula 41]}$$

However, attention needs to be paid to the fact that this conversion adjusts phases such that only Jxx holds a real number (the deflection angle is 0).

[Second Embodiment]

Figure 6:
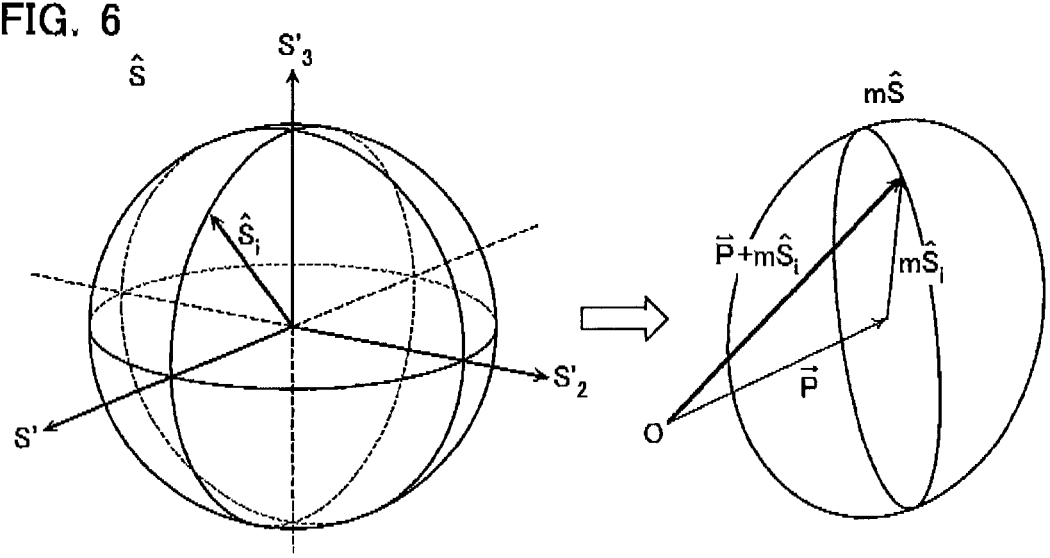
FIG. 6 illustrates that polarization states distributed on the s1-s3 surface of a Poincare sphere are projected to an ellipse using a Mueller matrix.
Figure 7:
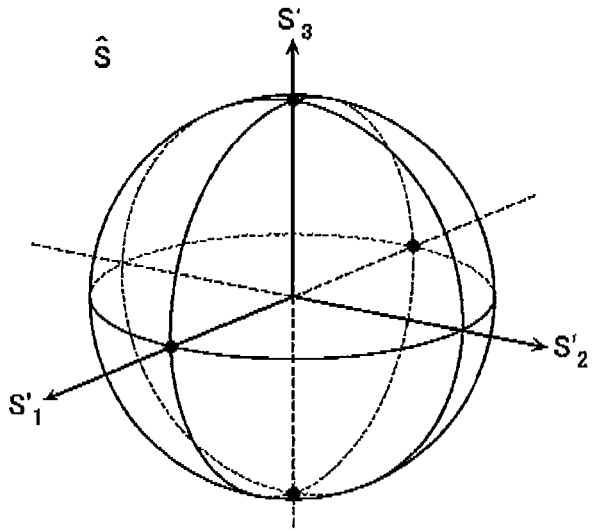
FIG. 7 illustrates four states of polarization used for the imaging calculation method according to the second embodiment.

Next, a method of calculating imaging according to the second embodiment is described with reference to FIGS. 6 and 7. The second embodiment relates to an exposure device which irradiates photomask 22 with an illumination light of a non-polarized light.

In some semiconductor exposure devices, a linearly-polarized light emitted from an excimer laser as a light source apparatus and polarized in a horizontal direction is converted into a pseudo non-polarized light, using a Hanle depolarization plate. Then, a photomask may be irradiated by the non-polarized illumination light.

The function of the Hanle depolarization plate is described using a Poincare sphere. One Hanle depolarization plate has a function of dispersing states of polarization such that the Poincare sphere is rotated with a rotational axis along a designated direction. Here, one case is assumed where polarization state of an incident light is a linearly-polarized light along a horizontal direction, that is, the polarization state of an incident light may be represented by a point along the +s1 axis. When a Hanle depolarization plate is set along +−45° direction in this case, a polarization state of an outgoing light is dispersed to a circumference of the s1-s3 surface, as shown in FIG. 6. A non-polarized illumination light with such a dispersion may be represented by four polarization states as shown in FIG. 7. That is, it can be represented by the next [Formula 42].

$$\begin{bmatrix} 1 \\ \vec{0} \end{bmatrix} = \frac{1}{4}\left\{ \begin{bmatrix} 1 \\ \hat{s}_1 \end{bmatrix} + \begin{bmatrix} 1 \\ -\hat{s}_1 \end{bmatrix} + \begin{bmatrix} 1 \\ \hat{s}_3 \end{bmatrix} + \begin{bmatrix} 1 \\ -\hat{s}_3 \end{bmatrix} \right\}$$ [Formula 42]

Also, the second term of [Formula 12] can be expressed as follows.

$$M\begin{bmatrix} 1 \\ \vec{0} \end{bmatrix} = \frac{m_{00}}{6}\left\{ \begin{bmatrix} |\vec{P}+m\hat{s}_1| \\ \vec{P}+m\hat{s}_1 \end{bmatrix} + \begin{bmatrix} |\vec{P}-m\hat{s}_1| \\ \vec{P}-m\hat{s}_1 \end{bmatrix} + \begin{bmatrix} |\vec{P}+m\hat{s}_3| \\ \vec{P}+m\hat{s}_3 \end{bmatrix} + \begin{bmatrix} |\vec{P}-m\hat{s}_3| \\ \vec{P}-m\hat{s}_3 \end{bmatrix} \right\} +$$
$$m_{00}\left\{ 1 - \frac{1}{4}\left( \frac{|\vec{P}+m\hat{s}_1|+|\vec{P}-m\hat{s}_1|+}{|\vec{P}+m\hat{s}_3|+|\vec{P}-m\hat{s}_3|} \right) \right\}\begin{bmatrix} 1 \\ \vec{0} \end{bmatrix}$$ [Formula 43]

That is, according to the present embodiment, non-polarized light component vector Snp after dividing the Stokes vector S into the polarization light component vector $S_p$ and the non-polarized light component vector $S_{np}$ can be further divided into a coherent component vector and a non-coherent component vector expressed by the [Formula 44] [Formula 45] below, respectively.

$$\frac{s_0(1-s)m_{00}}{4}\left\{ \begin{bmatrix} |\vec{P}+m\hat{s}_1| \\ \vec{P}+m\hat{s}_1 \end{bmatrix} + \begin{bmatrix} |\vec{P}-m\hat{s}_1| \\ \vec{P}-m\hat{s}_1 \end{bmatrix} + \begin{bmatrix} |\vec{P}+m\hat{s}_3| \\ \vec{P}+m\hat{s}_3 \end{bmatrix} + \begin{bmatrix} |\vec{P}-m\hat{s}_3| \\ \vec{P}-m\hat{s}_3 \end{bmatrix} \right\}$$ [Formula 44]

$$s_0(1-s)m_{00}\left\{ 1 - \frac{1}{4}\left( \frac{|\vec{P}+m\hat{s}_1|+|\vec{P}-m\hat{s}_1|+}{|\vec{P}+m\hat{s}_3|+|\vec{P}-m\hat{s}_3|} \right) \right\}\begin{bmatrix} 1 \\ \vec{0} \end{bmatrix}$$ [Formula 45]

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of calculating an image for calculating an image to be imaged by a projection optical system, comprising:
   acquiring a Stokes vector showing a characteristic of an illumination light;
   dividing the Stokes vector into a polarized light component vector and a non-polarized light component vector;
   dividing the polarized light component vector into a first coherent component vector and a first non-coherent component vector;
   dividing the non-polarized light component vector into a second coherent component vector and a second non-coherent component vector; and
   performing imaging calculation at least for the first coherent component vector and the second coherent component vector, respectively.

2. The method of calculating an image according to claim 1, wherein
   the non-polarized light component vector is expressed by a sum of six vectors, the six vectors including first to third completely-polarized light vectors perpendicular to one another on a Poincare sphere, and fourth to sixth completely-polarized light vectors having a diagonal relationship with the first to third completely-polarized light vectors, respectively.

3. The method of calculating an image according to claim 2, wherein
   the first to sixth completely-polarized light vectors are Stokes vectors (1, 1, 0, 0), (1, 0, 1, 0), (1, 0, 0, 1), (1, −1, 0, 0), (1, 0, −1, 0) and (1, 0, 0, −1).

4. The method of calculating an image according to claim 1, wherein
   the non-polarized light component vector is expressed by a sum of four vectors, the four vectors including first and second completely-polarized light vectors perpendicular to each other on a Poincare sphere, and third and fourth completely-polarized light vectors having a diagonal relationship with the first and second completely-polarized light vectors, respectively.

5. The method of calculating imaging according to claim 4, wherein
   the first to fourth completely-polarized light vectors are Stokes vectors (1, 1, 0, 0), (1, 0, 0, 1), (1, −1, 0, 0) and (1, 0, 0, −1).

6. The method of calculating imaging according to claim 4, wherein
   the illumination light is changed to a pseudo non-polarized light using a Hanle depolarization plate.

7. The method of calculating imaging according to claim 1, further comprising converting at least the first coherent component vector and the second coherent component to a Jones vector.

8. The method of calculating imaging according to claim 1, wherein
   the Stokes vector is acquired by arranging a polarization evaluation mask in an optical path of the illumination light, and analyzing a light that passed through the polarization evaluation mask and the projection optical system.

9. A storage medium storing a computer program for performing an imaging calculation method for simulating by calculation an image imaged by a projection optical system, the computer program allowing a computer to:
acquire a Stokes vector showing a characteristic of the illumination light;
divide the Stokes vector into a polarized light component vector and a non-polarized light component vector;
divide the polarized light component vector into a first coherent component vector and a first non-coherent component vector;
divide the non-polarized light component vector into a second coherent component vector and a second non-coherent component vector; and
perform imaging calculation at least for the first coherent component vector and the second coherent component vector, respectively.

10. The storage medium according to claim 9, wherein
the non-polarized light component vector is expressed by a sum of six vectors, the six vectors including first to third completely-polarized light vectors perpendicular to one another on a Poincare sphere, and fourth to sixth completely-polarized light vectors having a diagonal relationship with the first to third completely-polarized light vectors, respectively.

11. The storage medium according to claim 9, wherein
the first to sixth completely-polarized light vectors are Stokes vectors (1, 1, 0, 0), (1, 0, 1, 0), (1, 0, 0, 1), (1, −1, 0, 0), (1, 0, −1, 0) and (1, 0, 0, −1).

12. The storage medium according to claim 9, wherein
the non-polarized light component vector is expressed by a sum of four vectors, the four vectors including first and second completely-polarized light vectors perpendicular to each other on a Poincare sphere, and third and fourth completely-polarized light vectors having a diagonal relationship with the first and second completely-polarized light vectors, respectively.

13. The storage medium according to claim 9, wherein the computer program further performs converting at least the first coherent component vector and the second coherent component to a Jones vector.

14. The storage medium according to claim 9, wherein
the first to fourth completely-polarized light vectors are Stokes vectors (1, 1, 0, 0), (1, 0, 0, 1), (1, −1, 0, 0) and (1, 0, 0, −1).

15. A semiconductor exposure apparatus, comprising;
a light source configured to emit a light;
a photomask stage enabled to mount a photomask thereon;
a projection optical system configured to project the light from the light source onto a wafer,
a photodetector configured to receive a light that passes through the projection optical system;
an inclination evaluation mask mounted on the photomask stage in place of the photomask;
an operation device configured to operate a Stokes vector of the light based on a detection signal of the photodetector; and
a simulation device configured to perform an imaging calculation based on the Stokes vector,
the simulation device being configured to:
acquire a Stokes vector showing a characteristic of the illumination light;
divide the Stokes vector into a polarized light component vector and a non-polarized light component vector;
divide the polarized light component vector into a first coherent component vector and a first non-coherent component vector;
divide the non-polarized light component vector into a second coherent component vector and a second non-coherent component vector; and
perform imaging calculation at least for the first coherent component vector and the second coherent component vector, respectively.

16. The semiconductor exposure apparatus according to claim 15, wherein
the non-polarized light component vector is expressed by a sum of six vectors, the six vectors including first to third completely-polarized light vectors perpendicular to one another on a Poincare sphere, and fourth to sixth completely-polarized light vectors having a diagonal relationship with the first to third completely-polarized light vectors, respectively.

17. The semiconductor exposure apparatus according to claim 16, wherein
the first to sixth completely-polarized light vectors are Stokes vector (1, 1, 0, 0), (1, 0, 1, 0), (1, 0, 0, 1), (1, −1, 0, 0), (1, 0, −1, 0) and (1, 0, 0, −1).

18. The semiconductor exposure apparatus according to claim 15, wherein
the non-polarized light component vector is expressed by a sum of four vectors, the four vectors including first and second completely-polarized light vectors perpendicular to each other on a Poincare sphere, and third and fourth completely-polarized light vectors having a diagonal relationship with the first and second completely-polarized light vectors, respectively.

19. The semiconductor exposure apparatus according to claim 18, wherein
the first to fourth completely-polarized light vectors are Stokes vectors (1, 1, 0, 0), (1, 0, 0, 1), (1, −1, 0, 0) and (1, 0, 0, −1).

20. The semiconductor exposure apparatus according to claim 15, wherein
the simulation device further performs converting at least the first coherent component vector and the second coherent component to a Jones vector.

* * * * *